United States Patent [19]

Nakagawa et al.

[11] Patent Number: 4,959,414
[45] Date of Patent: Sep. 25, 1990

[54] COMPOSITION COMPRISING CHLOROSULFONATED ETHYLENE COPOLYMER, EPOXY RESIN AND DIMALEIMIDE

[75] Inventors: Tatsushi Nakagawa; Yoshiaki Ishida; Junichiro Kanesaka; Yosuke Kaneshige, all of Yamaguchi, Japan

[73] Assignee: Tosoh Corporation, Yamaguchi, Japan

[21] Appl. No.: 169,720

[22] Filed: Mar. 18, 1988

[30] Foreign Application Priority Data

Aug. 11, 1987 [JP] Japan .................. 62-199047

[51] Int. Cl.$^5$ ............................................. C08L 23/34
[52] U.S. Cl. ...................................... 525/11; 525/113; 523/435; 523/453; 523/457
[58] Field of Search ................. 525/112, 113; 523/435, 523/453, 457

[56] References Cited

U.S. PATENT DOCUMENTS

| | | |
|---|---|---|
| 2,416,069 | 2/1947 | Scott . |
| 4,141,878 | 2/1979 | Coran et al. .............. 525/240 |
| 4,197,381 | 4/1980 | Alia ........................ 525/214 |
| 4,410,648 | 10/1983 | Kato et al. ............... 524/371 |
| 4,572,870 | 2/1986 | Vasta ....................... 525/113 |
| 4,629,761 | 12/1986 | Wolfe, Jr. ................ 525/173 |

FOREIGN PATENT DOCUMENTS

| | | |
|---|---|---|
| 96490 | 2/1972 | European Pat. Off. . |
| 1469959 | 12/1969 | Fed. Rep. of Germany . |
| 2206634 | 10/1972 | Fed. Rep. of Germany . |
| 1259094 | 4/1960 | France . |

OTHER PUBLICATIONS

Chemical Abstracts, vol. 101, 1984, No. 24, pp. 54–55, Abstract No. 212476g.
Chemical Abstracts, vol. 102, 1985, no. 2, p. 92, Abstract No. 8344k.

Primary Examiner—John C. Bleutge
Assistant Examiner—Robert E. Sellers, II
Attorney, Agent, or Firm—Sughrue, Mion, Zinn, Macpeak & Seas

[57] ABSTRACT

A chlorosulfonated ethylene·α-olefin copolymer composition is disclosed, comprising
(a) 100 parts by weight of a chlorosufonated ethylene·α-olefin copolymer containing from 25 to 32% by weight chlorine and from 0.3 to 2.5% by weight sulfur,
(b) from 1 to 4 parts by weight of a metal oxide or a metal hydroxide,
(c) from 3 to 15 parts by weight of an epoxy compound,
(d) from 0.5 to 5 parts by weight of a thiuram, and
(e) from 0.5 to 5 parts by weight of a maleimide. The chlorosulfonated ethylene·α-olefin copolymer of the invention provides vulcanized products having excellent heat resistance, cold resistance and water resistance.

7 Claims, No Drawings

COMPOSITION COMPRISING CHLOROSULFONATED ETHYLENE COPOLYMER, EPOXY RESIN AND DIMALEIMIDE

FIELD OF THE INVENTION

This invention relates to a chlorosulfonated ethylene·α-olefin copolymer composition. More particularly, the invention relates to a chlorosulfonated ethylene·α-olefin copolymer composition more excellent in heat resistance, cold resistance and water resistance of the products thereof after vulcanization.

The chlorosulfonated copolymer composition of this invention is particularly useful in the field of rubber belts such as toothed rubber belts, poly-V-belts, etc.

BACKGROUND OF THE INVENTION

A chlorosulfonated polymer typified by chlorosulfonated polyethylene has properties similar to those of chloroprene rubber.

However, since the chlorosulfonated polymer is excellent in heat resistance, weather resistance and ozone resistance as compared with chloroprene rubber, the chlorosulfonated polymer is frequently used as a polymer having more excellent heat resistance.

Accordingly, in the field wherein the heat resistance of conventional chloroprene rubber is yet insufficient, it has been attempted to replace the chloroprene rubber with a chlorosulfonated polymer.

For example, there are rubber belts such as toothed belts and poly-V-belts made of such a chlorosulfonated polymer.

However, since chlorosulfonated polyethylene is inferior in cold resistance as compared with chloroprene rubber, it is sometimes difficult to clear the problem of the cold resistance required for toothed belt.

On the other hand, in the field of toothed rubber belt, it is the most important technical theme to improve the water resistance of the product in addition to the aforesaid heat resistance and cold resistance thereof.

It is known that for improving the heat resistance and water resistance of the vulcanized product of chlorosulfonated polyethylene, the use of a lead compound such as litharge, red lead oxide, etc., as an acid-acceptor is effective. However, the use of such a lead compound is undesirable because of the problem of environmental pollution by toxicity of the lead compound.

SUMMARY OF THE INVENTION

As the result of various investigations for obtaining vulcanized products having more excellent heat resistance, cold resistance, and water resistance under the aforesaid circumstances, the inventors have succeeded in attaining the present invention.

An object of this invention is, therefore, to provide a chlorosulfonated ethylene·α-olefin copolymer composition more excellent in heat resistance, cold resistance, and water resistance of the product thereof after vulcanization.

The chlorosulfonated copolymer composition of this invention is particularly effective as a composition for rubber belts such as toothed belts, poly-V belts, etc.

That is, the invention is concerned with a chlorosulfonated ethylene·α-olefin copolymer composition comprising (a) 100 parts by weight of a chlorosulfonated ethylene·α-olefin copolymer containing from 25 to 32% by weight chlorine and from 0.3 to 2.5% by weight sulfur, (b) from 1 to 4 parts by weight of a metal oxide or a metal hydroxide, (c) from 3 to 15 parts by weight of an epoxy compound, (d) from 0.5 to 5 parts by weight of a thiuram, and (e) from 0.5 to 5 parts by weight of a maleimide.

DETAILED DESCRIPTION OF THE INVENTION

For obtaining vulcanized products excellent in heat resistance, cold resistance, and water resistance in this invention, it is important to use a specific combination of the specific components described above.

That is, the chlorosulfonated ethylene·α-olefin copolymer composition contains components (a), (b), (c), (d), and (e) described above as indispensable components.

The chlorosulfonated ethylene·α-olefin copolymer is generally a product obtained by chlorinating and chlorosulfonating an ethylene·α-olefin copolymer as the raw material.

As the ethylene·α-olefin copolymer, there are, for example, an ethylene·hexene-1 copolymer, an ethylene-propylene copylymer, an ethylene·hexene-1 copolymer, an ethylene·octene-1 copolymer, and an ethylene·4-methylpentene-1 copolymer.

In the copolymer, the ratio of ethylene/α-olefin is desirably from 98/2 to 60/40.

If the ratio is outside the aforesaid range, the desired cold resistance becomes unobtainable.

A particularly preferred ethylene·α-olefin copolymer is a copolymer of ethylene and butene-1 having an ethylene/butene-1 ratio in the range of from 95/5 to 70/30.

If the composition of ethylene and α-olefin as the raw materials for the copolymer is once selected, the composition of ethylene and α-olefin is kept as it is in the chlorosulfonated ethylene·α-olefin copolymer obtained by chlorinating and chlorosulfonating the copolymer.

On the other hand, the mole ratio of ethylene and butene-1 may be expressed by the number of ethyl groups per 1,000 carbon atoms. That is, the component ratio of a composition having an ethylene/butene-1 ratio of from 98/2 to 60/40 may be expressed as from 10 to 200 ethyl groups per 1,000 carbon atoms.

The content of chlorine contained in the chlorosulfonated ethylene·α-olefin copolymer is preferably from 25 to 32% by weight.

If the chlorine content is less than 25% by weight or over 32% by weight, the desired cold resistance is unobtainable for the copolymer composition. A particularly preferred chlorine content is from 28 to 31% by weight.

The content of sulfur contained in the chlorosulfonated ethylene·α-olefin copolymer for use is a measure of showing the content of the group shown by —SO₂Cl acting as crosslinking sites and is preferably from 0.3 to 2.5% by weight, more preferably from 0.5 to 1.5% by weight.

For synthesizing the chlorosulfonated ethylene·α-olefin copolymer, a method of reacting an ethylene·α-olefin copolymer as the raw material with chlorine and sulfur dioxide, chlorine and sulfuryl chloride or sulfuryl chloride alone using a radical generating agent as a catalyst is generally employed.

For performing the aforesaid reaction, there are a homogeneous system of performing the reaction in a solution of the reactants, a heterogeneous system of performing the reaction in a suspension, and a heterogeneous system of performing the reaction in a gaseous phase. The homogeneous system of performing the reaction in a solution of an ethylene·α-olefin copolymer as a raw material dissolved in a solvent gives the chlorosulfonated ethylene·α-olefin copolymer excellent in both the heat resistance and cold resistance and, hence, is preferably used in this invention.

In this case, a solvent inert for the halogenation reaction, such as carbon tetrachloride, chloroform, monochlorobenzene, tetrachloroethane, etc., is used as the solvent.

The chlorosulfonated copolymer composition of this invention is obtained by adding (b) from 1 to 4 parts by weight of a metal oxide or a metal hydroxide, (c) from 3 to 15 parts by weight of an epoxy compound, (d) from 0.5 to 5 parts by weight of a thiuram, and (e) from 0.5 to 5 parts by weight of a maleimide to (a) 100 parts by weight of the chlorosulfonated ethylene·α-olefin copolymer containing from 25 to 32% by weight chlorine and from 0.3 to 2.5% by weight sulfur obtained as described above.

A metal oxide or metal hydroxide is generally used as an acid-acceptor at the vulcanization of a chlorosulfonated polymer, and examples thereof are magnesia, calcium oxide, and calcium hydroxide.

On the other hand, the metal oxide or metal hydroxide increases the acid-accepting effect in cooperation with an epoxy compound.

The metal oxide or metal hydroxide is added in an amount of from 1 to 4 parts by weight. If the addition amount thereof is less than 1 part by weight, a sufficient acid-accepting effect is not obtained; and if the amount is over 4 parts by weight, sufficient water resistance cannot be obtained. A preferred addition amount thereof is from 2 to 3 parts by weight.

The addition of an epoxy compound is particularly important for increasing the water resistance of the vulcanized product.

As the epoxy compound, there are Epikote ® 828, 825, 834, 807, 152, 154, 871, 872, 190P, 191P, and 604 (trade names, made by Yuka Shell Epoxy Co.).

The epoxy compound is used in an amount of from 3 to 15 parts by weight. If the amount thereof is less than 3 parts by weight, sufficient water resistance is not obtained, while if the amount is over 15 parts by weight, the heat resistance of the vulcanized product is reduced. A preferred addition amount thereof is from 8 to 12 parts by weight.

A thiuram is generally known as a vulcanization accelerator. Examples thereof are dipentamethylenethiuram tetrasulfide (TRA), tetramethylthiuram monosulfide (TS), tetramethylthiuram disulfide (TT or TMTD), and tetraethylthiuram disulfide (TET).

The thiuram is used in an amount of from 0.5 to 5 parts by weight. If the amount is less than the aforesaid range, the vulcanization speed and the vulcanization density are not increased, while if the amount is larger than the range, the water resistance is reduced. The amount thereof is preferably from 1 to 3 parts by weight.

A maleimide is used as a vulcanization accelerator or an antioxidant, and an example thereof is N,N'-m-phenylenedimaleimide.

The maleimide is also commercially available as Vulnoc ® PM or HVA-2.

The maleimide is used in an amount of from 0.5 to 5 parts by weight and is preferably from 1 to 3 parts by weight for increasing the heat resistance.

The chlorosulfonated ethylene·α-olefin copolymer is vulcanized by the coaction of the metal oxide or metal hydroxide, epoxy compound, thiuram, and maleimide described above.

The vulcanization mechanism has not yet been clarified, but the important matter in this invention is that the aforesaid object can be attained by a specific combination in this invention.

The polymer composition of this invention may, if necessary, further contain other ordinary rubber compounding ingredients such as a reinforcing agent, a filler, a plasticizer, an antioxidant, a processing aid, etc., in addition to aforesaid indispensable components (a), (b), (c), (d), and (e).

As the reinforcing agent and filler, there are, for example, carbon black, white carbon, calcium carbonate, clay, talc, and titanium oxide.

As the plasticizer, there are, for example, various oils, esters, and chlorinated paraffins.

As the antioxidant, there are, for example, nickel dibutyldithiocarbamate (NBC), amine compounds, and phenolic compounds.

As the processing aid, there are, for example, low molecular weight polyethylene and metal soaps.

In addition, as described above, in this invention, the aforesaid object can be attained by the proper vulcanization of a chlorosulfonated ethylene·α-olefin copolymer. Therefore, in the case of using materials directly giving influences on the vulcanization, such as a vulcanizing agent and a vulcanization accelerator together with the aforesaid indispensable components in this invention, the addition amount, the kind, etc., thereof must be carefully selected. For example, when a vulcanizing agent or a vulcanization accelerator is used together with the aforesaid components, the addition amount thereof must be less than 3 parts by weight.

The chlorosulfonated copolymer composition of this invention is obtained by compounding the aforesaid components by an internal mixer such as a Banbury mixer and an inter mixer or an ordinary rubber mixer such as an open roll mill, etc.

The composition thus obtained is vulcanized by press vulcanization, steam vulcanization, ultra high frequency (UHF) vulcanization, hot air vulcanization, etc., to provide vulcanized products.

The following examples are intended to illustrate the present invention more practically but not to limit it in any way.

In addition, the values used in these examples were obtained according to the following measurement methods.

Mole ratio of ethylene to butene

| | |
|---|---|
| Mole ratio of ethylene to butene-1 | Analyzed by $^{13}$C-NMR (nuclear magnetic resonance) |
| Melt index | JIS K 7210 |
| Density | JIS K 7112 |
| Mooney viscosity ($ML_{1+4}$, 100° C.) | JIS K 6300 |
| Vulcanized rubber property | JIS K 6301. |

In addition, the chlorosulfonated ethylene-butene-1 copolymers used in these examples were prepared as follows.

Chlorosulfonated copolymer used in Examples 1, 4, and 5 and Comparison Examples 1, 2, and 4

After dissolving 3360 g of an ethylene-butene-1 copolymer (melt index: 4 g/10 min., density: 0.89 g/cc) composed of 91.7 mole% ethylene and 8.3 mole% butene-1 in carbon tetrachloride, the copolymer was reacted with 5620 g of sulfuryl chloride with the addition of 12g of $\alpha\alpha'$-azobisisobutyronitrile as a radical generating agent and 0.25 g of pyridine as a promoter.

After the reaction was over, acid components remaining in the solution were removed, and then 17 g of 2,2'-bis(4-glycidyloxyphenyl)propane was added thereto. Then, the solution was fed to a drum dryer by an ordinary manner to separate the product from the solvent.

The result of the analysis of the chlorosulfonated ethylene-butene-1 copolymer thus obtained showed that the copolymer contained 30.1% by weight of chlorine and 1.02% by weight sulfur. The Mooney viscosity ($ML_{1+4}$, 100° C.) was 58. The chlorosulfonated copolymer was defined as A-1.

Chlorosulfonated copolymer used in Example 2

By following the same procedure as above except that the following ethylene-butene-1 copolymer was used as the raw material, a chlorosulfonated copolymer was obtained.

Ethylene-butene-1 copolymer

Ratio of ethylene/butene-1: 92.3/7.7
Melt index: 3 g/10 min.
Density: 0.89 g/cc.

The result of the analysis of the chlorosulfonated ethylene-butene-1 copolymer thus obtained showed that the copolymer contained 30.0% by weight of chlorine and 0.99% by weight sulfur. The Mooney viscosity ($ML_{1+4}$, 100° C.) thereof was 65. The chlorosulfonated copolymer was defined as A-2.

Chlorosulfonated copolymer used in Example 3

By following the same procedure as above except that the following ethylene-butene-1 copolymer was used as the raw material, a chlorosulfonated copolymer was obtained.

Ethylene-butene-1 copolymer

Ratio of ethylene/butene-1: 92.3/7.7
Melt index: 8 g/10 min.
Density: 0.89 g/cc.

The result of the analysis of the chlorosulfonated ethylene-butene-1 copolymer thus obtained showed that the copolymer contained 30.0% by weight chlorine and 1.01% by weight sulfur. The Mooney viscosity ($ML_{1+4}$, 100° C.) was 44. The chlorosulfonated copolymer was defined as A-3.

EXAMPLES 1 TO 5 AND COMPARISON EXAMPLES 1 TO 4

The compounding ingredients shown in Table 1 below were kneaded by means of an open roll mill and then vulcanized for 40 minutes at 150° C. to provide each vulcanized sheet.

Thereafter, the properties of the vulcanized products were measured, and the results obtained are shown in Table 1 below. In addition, of the cold resistance, a Gehman torsion test was used.

TABLE 1

| | Example 1 | Example 2 | Example 3 | Example 4 | Example 5 | Comparison Example 1 | Comparison Example 2 | Comparison Example 3 | Comparison Example 4 |
|---|---|---|---|---|---|---|---|---|---|
| | | | | Components | | | | | |
| A-1*[1] | 100 | | | 100 | 100 | 100 | 100 | | 100 |
| A-2*[2] | | 100 | | | | | | | |
| A-3*[3] | | | 100 | | | | | | |
| Hypalon ® 40*[2] | | | | | | | | 100 | |
| Epikote ® 828 | 10 | | | 8 | 8 | | 10 | 10 | 10 |
| Epikote ® 825 | | 10 | | | | | | | |
| Epikote ® 152 | | | 10 | | | | | | |
| Magnesia | 3 | 3 | 3 | | | 3 | 3 | 3 | 8 |
| Calcium Carbonate | | | | 3 | | | | | |
| Calcium oxide | | | | | 3 | | | | |
| SRF carbon black | 35 | 35 | 35 | 35 | 35 | 35 | 35 | 35 | 35 |
| Dioctyl sebacate (DOS) | 8 | 8 | 8 | 8 | 8 | 8 | 8 | 8 | 8 |
| Suntight ® | 2 | 2 | 2 | 2 | 2 | 2 | 2 | 2 | 2 |
| Accelerator TRA | 2 | 2 | 2 | 2 | 2 | 2 | 2 | 2 | 2 |
| Accelerator PM | 2 | 2 | 2 | 2 | 2 | | | 2 | 2 |
| | | | | Vulcanization Characteristics | | | | | |
| Tensile Characteristics | | | | | | | | | |
| $H_S$ (JIS A) | 67 | 67 | 65 | 67 | 66 | 68 | 66 | 66 | 68 |
| $T_B$ (kg/cm²) | 233 | 213 | 225 | 218 | 203 | 216 | 219 | 224 | 211 |
| $E_B$ (%) | 430 | 410 | 450 | 370 | 370 | 370 | 400 | 410 | 390 |
| $M_{100}$ (kg/cm²) | 23 | 25 | 20 | 28 | 25 | 39 | 28 | 27 | 36 |
| Heat Resistance | | | | | | | | | |
| $\Delta E_B$ (%)*[3] | −12 | −10 | −11 | −12 | −11 | −12 | −25 | −13 | −12 |
| C-Set (%)*[4] | 72 | 66 | 74 | 69 | 71 | 72 | 84 | 72 | 70 |
| Water | | | | | | | | | |

TABLE 1 -continued

|  | Example 1 | Example 2 | Example 3 | Example 4 | Example 5 | Comparison Example 1 | Comparison Example 2 | Comparison Example 3 | Comparison Example 4 |
|---|---|---|---|---|---|---|---|---|---|
| Resistance |  |  |  |  |  |  |  |  |  |
| ΔV (%)*5 | 6.4 | 6.1 | 5.8 | 8.7 | 8.8 | 29.5 | 6.3 | 6.8 | 25.9 |
| Gehman Torsion Test |  |  |  |  |  |  |  |  |  |
| $T_2$ (°C.) | −17 | −17 | −18 | −18 | −17 | −17 | −17 | −10 | −17 |
| $T_5$ (°C.) | −25 | −25 | −25 | −26 | −25 | −26 | −25 | −17 | −25 |
| $T_{10}$ (°C.) | −28 | −28 | −28 | −29 | −28 | −29 | −28 | −20 | −29 |
| $T_{100}$ (°C.) | −36 | −36 | −35 | −36 | −35 | −35 | −36 | −30 | −35 |

*1 Chlorosulfonated ethylene·α-olefin copolymer
*2 Chlorosulfonated polyethylene, made by E. I. Du Pont
*3 Change of elongation after 70 hours at 120° C.
*4 Compression set after 22 hours at 120° C.
*5 Volume change after 8 hours in boiling water As shown in the above table, the chlorosulfonated ethylene·α-olefin copolymer compositions in Examples 1 to 5 of this invention give vulcanized products having excellent heat resistance, cold resistance, and water resistance.

On the other hand, the chlorosulfonated copolymer composition without using epoxy compound in Comparison Example 1 gives the vulcanized product thereof without having desired water resistance. Also, the chlorosulfonated copolymer composition in Comparison Example 2 gives the vulcanized product thereof inferior in heat resistance owing to lacking in a maleimide. Furthermore, the chlorosulfonated copolymer composition in Comparison Example 3 using Hypalon ® (chlorosulfonated polyethylene) in place of a chlorosulfonated ethylene·α-olefin copolymer gives the vulcanized product without having desired cold resistance. Also, the chlorosulfonated copolymer composition in Comparison Example 4 using 8 parts by weight of magnesia, i.e., over the addition amount of a metal oxide defined in this invention gives the vulcanized product without having desired water resistance.

Thus, it is clear from these examples and comparison examples that the chlorosulfonated ethylene·α-olefin copolymer composition of this invention can provide a vulcanized product excellent in heat resistance, cold resistance and water resistance.

The chlorosulfonated copolymer composition of this invention is thus particularly useful as materials for making rubber belts such as toothed belts, poly-V-belts, etc.

Furthermore, the chlorosulfonated copolymer composition of this invention can be also applied in other fields of requiring heat resistance, cold resistance, and water resistance, such as sheets, coating materials for cables, hoses, etc.

While the invention has been described in detail and with reference to specific embodiments thereof, it will be apparent to one skilled in the art that various changes and modifications can be made therein without departing from the spirit and scope thereof.

What is claimed is:

1. A chlorosulfonated ethylene·α-olefin copolymer composition for rubber belts comprising
   (a) 100 parts by weight of a chlorosulfonated ethylene·α-olefin copolymer containing from 25 to 32% by weight chlorine and from 0.3 to 2.5% by weight sulfur,
   (b) from 1 to 4 parts by weight of a metal oxide or a metal hydroxide,
   (c) from 3 to 15 parts by weight of an epoxy compound selected from bisphenol A epoxy resins and phenol-novolak epoxy resins,
   (d) from 0.5 to 5 parts by weight of a thiuram, and
   (e) from 0.5 to 5 parts by weight of a dimaleimide.

2. The chlorosulfonated copolymer composition as claimed in claim 1, wherein the chlorinated ethylene·α-olefin copolymer is obtained by chlorinating and chlorosulfonating an ethylene·α-olefin copolymer.

3. The chlorosulfonated copolymer composition as claimed in claim 2, wherein the ratio of ethylene/α-olefin in the ethylene·α-olefin copolymer is from 98/2 to 60/40.

4. The chlorosulfonated copolymer composition as claimed in claim 2, wherein the ethylene·α-olefin copolymer is an ethylene·butene-1 copolymer.

5. The chlorosulfonated copolymer composition as claimed in claim 1, wherein the metal oxide is magnesia or calcium oxide.

6. The chlorosulfonated copolymer composition as claimed in claim 1, wherein the metal hydroxide is calcium hydroxide.

7. A rubber belt comprising as components
   (a) 100 parts by weight of a chlorosulfonated ethylene·α-olefin copolymer containing from 25 to 32% by weight chlorine and from 0.3 to 2.5% by weight sulfur,
   (b) from 1 to 4 parts by weight of a metal oxide or a metal hydroxide,
   (c) from 3 to 15 parts by weight of an epoxy compound selected from bisphenol A epoxy resins and phenol-novolak epoxy resins,
   (d) from 0.5 to 5 parts by weight of a thiuram, and
   (e) from 0.5 to 5 parts by weight of a dimaleimide, said components being compounded and then vulcanized.

* * * * *